United States Patent
Jinbo et al.

(10) Patent No.: US 7,938,234 B2
(45) Date of Patent: May 10, 2011

(54) MULTI-POSITION BRAKE LEVER SYSTEM WITH A CONVERTER THAT CONVERTS A CABLE ACTUATOR TO A HYDRAULIC ACTUATOR

(75) Inventors: Masahiko Jinbo, Sakai (JP); Takeshi Takachi, Sakai (JP); Satoshi Shahana, Sakai (JP); Yoshitsugu Yamada, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 809 days.

(21) Appl. No.: 11/772,788

(22) Filed: Jul. 2, 2007

(65) Prior Publication Data

US 2009/0008198 A1    Jan. 8, 2009

(51) Int. Cl.
*B62L 3/00* (2006.01)

(52) U.S. Cl. .............. 188/24.22; 188/2 D; 188/344; 60/594

(58) Field of Classification Search ........... 188/24.22, 188/344; 60/594, 582; 92/217
See application file for complete search history.

(56) References Cited

U.S. PATENT DOCUMENTS

| | | | |
|---|---|---|---|
| 2,148,273 A * | 2/1939 | La Brie | ............ 60/585 |
| 2,213,947 A | 9/1940 | Bowen | |
| 2,271,273 A | 1/1942 | Mueller | |
| 2,473,168 A | 6/1949 | Milster | |
| 3,803,937 A | 4/1974 | Johnston | |
| 4,245,522 A | 1/1981 | Robinson | |
| 4,930,798 A | 6/1990 | Yamazaki | |
| 5,094,322 A | 3/1992 | Casillas | |
| 5,299,466 A | 4/1994 | Heilbron | |
| 5,443,134 A | 8/1995 | Gajek | |
| 5,690,192 A | 11/1997 | Kuo | |
| 5,803,207 A | 9/1998 | Nielsen | |
| 5,813,501 A * | 9/1998 | Terry, Sr. | ............ 188/344 |
| 6,491,144 B2 * | 12/2002 | Ueda et al. | ............ 188/269 |
| 7,204,088 B2 * | 4/2007 | Uchiyama et al. | ............ 60/594 |
| 7,249,661 B2 | 7/2007 | Becocci | |

(Continued)

FOREIGN PATENT DOCUMENTS

EP        0875443 A2    4/1998

(Continued)

OTHER PUBLICATIONS

European Search Report dated Sep. 17, 2009 for related European Application No. 08005623.7.

(Continued)

*Primary Examiner* — Robert Siconolfi
*Assistant Examiner* — Mariano Sy
(74) *Attorney, Agent, or Firm* — Jeffer Mangels Butler & Mitchell LLP

(57) ABSTRACT

A hydraulic assembly for a hydraulic disc brake system that includes a housing defining a cylinder, a piston received in and moveable within the cylinder, a first lever operatively associated with one of the piston or the cylinder, and a second lever operatively associated with the other of the piston or the cylinder. Moving the first lever pushes one of the piston or the cylinder in a first direction, and moving the second lever pulls the other of the cylinder or the piston in a second direction. In a preferred embodiment, the piston has a non-actuated position and a fully actuated position, and the piston is biased towards the non-actuated position, and wherein the cylinder has a non-actuated and a fully-actuated position, and the cylinder is biased towards the non-actuated position.

13 Claims, 13 Drawing Sheets

U.S. PATENT DOCUMENTS

| | | | |
|---|---|---|---|
| 7,461,724 B2 * | 12/2008 | Nago | 188/24.22 |
| 2006/0152071 A1 * | 7/2006 | Takeuchi | 303/9.64 |
| 2006/0266595 A1 | 11/2006 | Nago | |

FOREIGN PATENT DOCUMENTS

| | | |
|---|---|---|
| EP | 0875443 A3 | 11/1999 |
| EP | 1726516 A2 | 11/2006 |
| JP | 54064339 | 5/1979 |
| JP | 02002294 A | 1/1990 |
| JP | 11189189 A | 7/1999 |
| WO | W09955567 | 11/1999 |

OTHER PUBLICATIONS

Extended European Search Report issued on Nov. 13, 2009 for related European Patent Application No. 08005623.7.

Extended European search report issued on Jul. 12, 2010, in related European Patent Application 10165350.9.

* cited by examiner

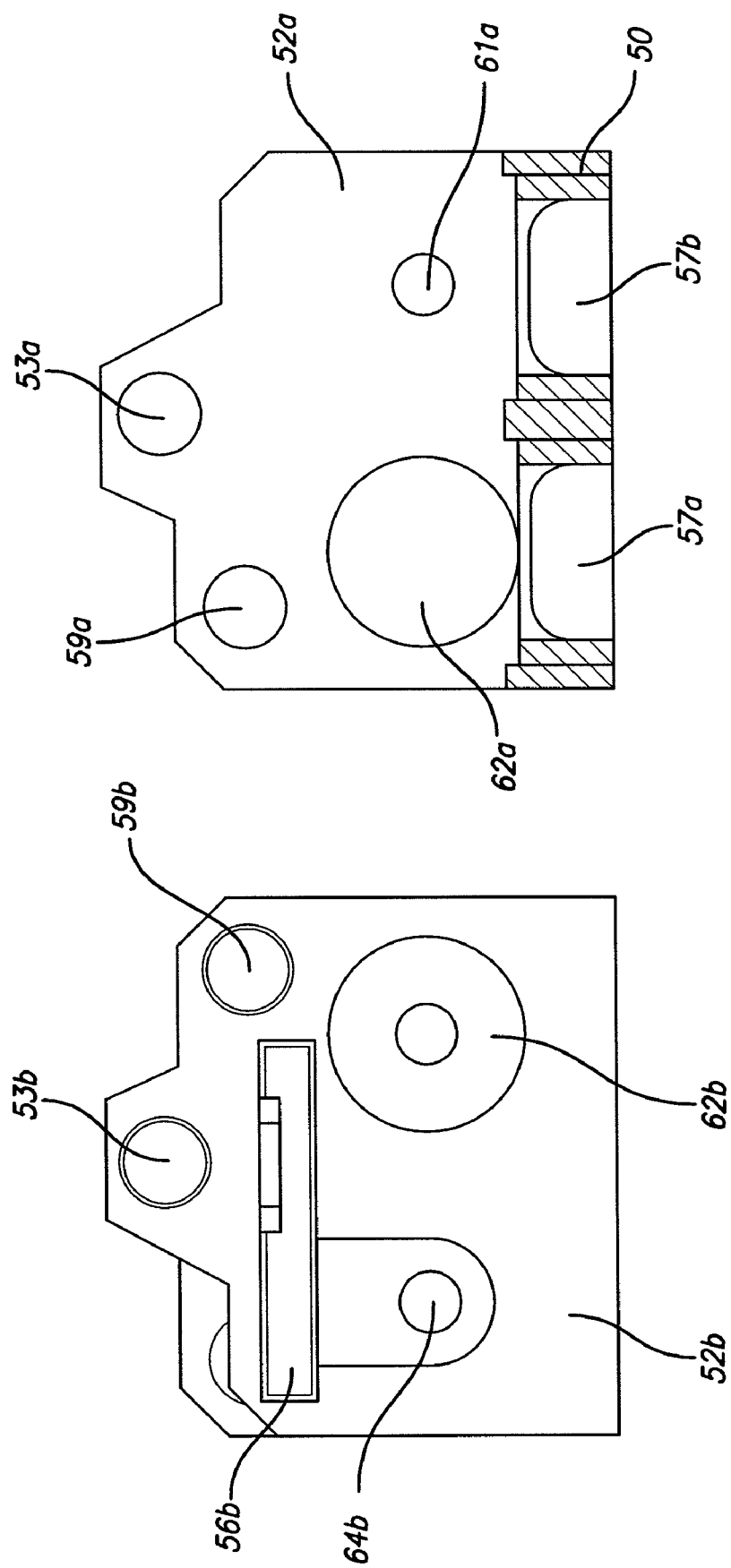

US 7,938,234 B2

MULTI-POSITION BRAKE LEVER SYSTEM WITH A CONVERTER THAT CONVERTS A CABLE ACTUATOR TO A HYDRAULIC ACTUATOR

FIELD OF THE INVENTION

The present invention relates to a multi-position hydraulic brake actuator for a bicycle. More specifically, the present invention relates to a hydraulic multi-position brake actuator with a converter that converts a cable actuator to a hydraulic actuator.

BACKGROUND OF THE INVENTION

A typical hydraulic system includes a master piston disposed in a master cylinder. The master piston and cylinder define a variable fluid containing volume within the master cylinder which is adjusted as the piston is moved within the master cylinder. In known systems, the master cylinder is typically disposed in a housing and remains stationary, while the position of the piston within the master cylinder is adjustable. Because only the piston is adjustable, the flexibility of known devices is somewhat limited.

Hydraulic systems have been used to actuate bicycle brakes. However, the limitations of such known devices have at times made braking inconvenient or difficult. When riding a bicycle, riders frequently adopt various postures. For example, when racing, bikers may lean over to reduce wind resistance. These bikers may want to actuate the brake lever that is at a location closer to the middle of the handlebar. Conversely, when riding casually, bikers may want to actuate a brake lever that is at a different location. In addition, bikers may want these brake levers located on one side of the handlebar, perhaps on the right side if they are right-handed. However, known hydraulic brake systems only provide one lever at one location on the handlebars. As a result, a brake lever that is optimally positioned for racing may be poorly positioned for casual riding and vice-versa.

Also, a typical cable brake lever has a cable that runs from the lever all the way to the brakes. This type of brake is inefficient and often has limited braking power. Thus, there is a need for a hydraulic braking system that addresses these limitations.

SUMMARY OF THE PREFERRED EMBODIMENTS

In accordance with a first aspect of the present invention, there is provided a hydraulic assembly for a hydraulic disc brake system that includes a housing defining a cylinder, a piston received in and moveable within the cylinder, a first lever operatively associated with one of the piston or the cylinder, and a second lever operatively associated with the other of the piston or the cylinder. Moving the first lever pushes one of the piston or the cylinder in a first direction, and moving the second lever pulls the other of the cylinder or the piston in a second direction. In a preferred embodiment, the piston has a non-actuated position and a fully actuated position, and the piston is biased towards the non-actuated position, and wherein the cylinder has a non-actuated and a fully-actuated position, and the cylinder is biased towards the non-actuated position.

In accordance with another aspect of the present invention, there is provided a hydraulic assembly for a hydraulic disc brake system, comprising a base plate that includes at least one track, a housing defining a cylinder, a piston received in and moveable within the cylinder, and a bracket connected to the base plate. The housing is slidingly seated on the track and the bracket is configured to attach the base plate to a handlebar.

BRIEF DESCRIPTION OF THE DRAWINGS

The invention may be more readily understood by referring to the accompanying drawings in which:

FIG. 8D is a right end elevational view of the side plate and lever attachment bracket; and FIG. 8E is a cross-sectional side elevational view of the base plate and side plate taken along line 8E-8E of FIG. 8C.

Like numerals refer to like parts throughout the several views of the drawings.

DETAILED DESCRIPTION OF THE PREFERRED EMBODIMENTS

Figure 1:
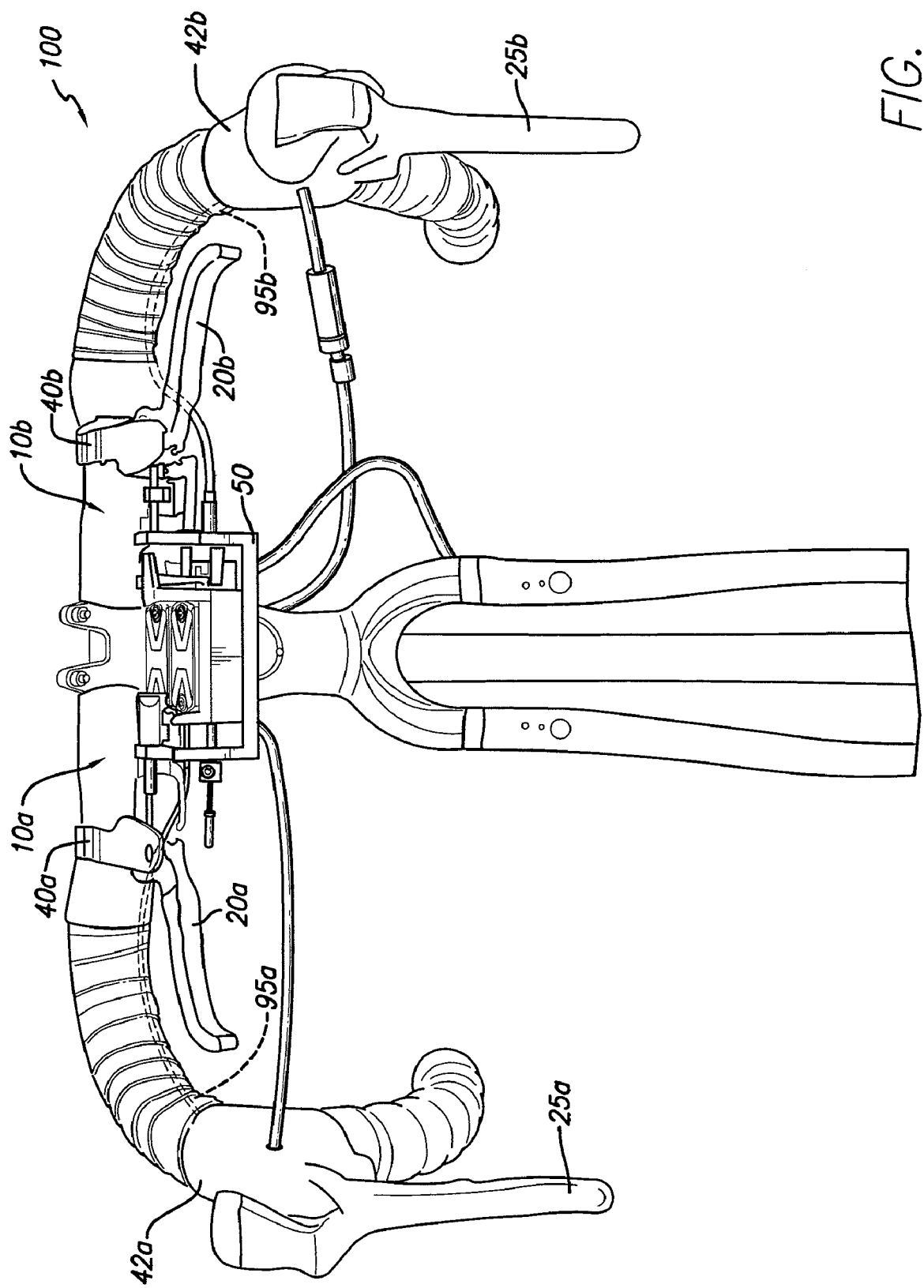
FIG. 1 is a front perspective view of a bicycle having a hydraulic assembly according to the present invention attached thereto.

As shown in the drawings, for purposes of illustration, the invention is embodied in a multi-position brake lever system for a bicycle.

It will be appreciated that terms such as "front," "back," "top," "bottom," "left," "right," "horizontally" and "side" used herein are merely for ease of description and refer to the orientation of the components as shown in the figures. It should be understood that any orientation of the brake lever assembly, and the components thereof described herein, is within the scope of the present invention.

Referring to FIGS. 1-7, a preferred embodiment of a hydraulic assembly 100 is shown and described. Generally, hydraulic assembly 100 includes a pair of housing assemblies 10*a* and 10*b*, a base plate 50, and two sets of levers 20 and 25. The housing assemblies 10*a* and 10*b* each generally comprise a housing 55 that includes a cylinder 60 having a piston 80 that is moveable therein.

It will be understood that in a preferred embodiment of the present invention, the overall hydraulic assembly 100 includes four levers and two housing assemblies. The housing assembly that is operated by the levers on the rider's right hand side is referred to herein as 10a and the housing assembly that is operated by the levers on the rider's left hand side is referred to herein as 10b. Moreover, each of the components that are associated with housing assembly 10a include an "a" suffix and each of the components that are associated with housing assembly 10b include a "b" suffix. However, for ease of description and because the assemblies 10a and 10b operate in generally the same manner, any of the components of the hydraulic assembly 100 may be referred to herein generically without the "a" or "b" suffix. For example, the housing assemblies may be referred to individually as 10a and/or 10b or they may be referred to generically as housing assembly 10. Also, for example, see FIGS. 3A-3C.

In the exemplary embodiment shown in the figures, the levers 20a and 25a on the right side of the handle bar operate housing 55a and piston 80a (which operates the rear brake system) and the levers 20b and 25b on the left side of the handle bar operate the second housing 55b and piston 80b (which operates the front brake system). However, it will be understood that this is not a limitation on the present invention.

It will be understood by those skilled in the art that first lever 20 is a hydraulic brake lever and second lever 25 is a cable brake lever. The inventive design of the housing assemblies 10 allows the cable brake lever 25 to move piston 80 in cylinder 60, thereby actuating the braking system. In other words, the housing assembly 10 essentially converts the cable brake lever 25 into a hydraulic brake lever.

As will be described below, in a preferred embodiment, the movement of the first 20 and/or the second levers 25 are preferably used to force hydraulic fluid from housing assembly 10 to a hydraulic disc brake system. It will be understood by those skilled in the art that hydraulic assembly 100 is preferably operatively connected to at least one and preferably a front and rear hydraulic disc brake system. The present invention may be used with a number of hydraulic disc brake systems, including bicycle hydraulic disc brake systems such as those described in U.S. Pat. No. 6,491,144 (the "'144 patent"), the entirety of which is incorporated herein by reference. However, the present invention is not limited to any particular hydraulic system or hydraulic disc brake system. Thus, the disclosure of the '144 patent is referenced herein to illustrate a preferred embodiment of the present invention only. As shown in FIG. 16 of the '144 patent, hydraulic disc brake systems typically comprise a caliper housing and one or more slave pistons which are movable in response to changes in hydraulic fluid pressure applied via hydraulic fluid conduits in the caliper housing. As is also shown, the slave pistons typically include a friction member, such as a brake pad.

FIG. 16 of the '144 patent shows such a hydraulic disc brake system in use on a bicycle. As indicated, in bicycle applications the caliper housing is typically placed proximate a bicycle rotor which is mounted on and rotates with a front or rear wheel of the bicycle. The brake pads are typically positioned on opposite sides of the rotor. When braking is desired, hydraulic pressure is applied to the slave pistons to force the friction members to contact the rotor. The frictional resistance of the friction members against the rotor causes the bicycle wheel to rotate more slowly and eventually to stop rotating.

Preferably, the hydraulic assembly 100 is attached to a bicycle handlebar 15. As described above, the inventive hydraulic assembly 100 may include a number of different brake lever systems. It will be understood that the brake levers shown in the figures are merely exemplary and are not a limitation of the present invention.

Figure 7:
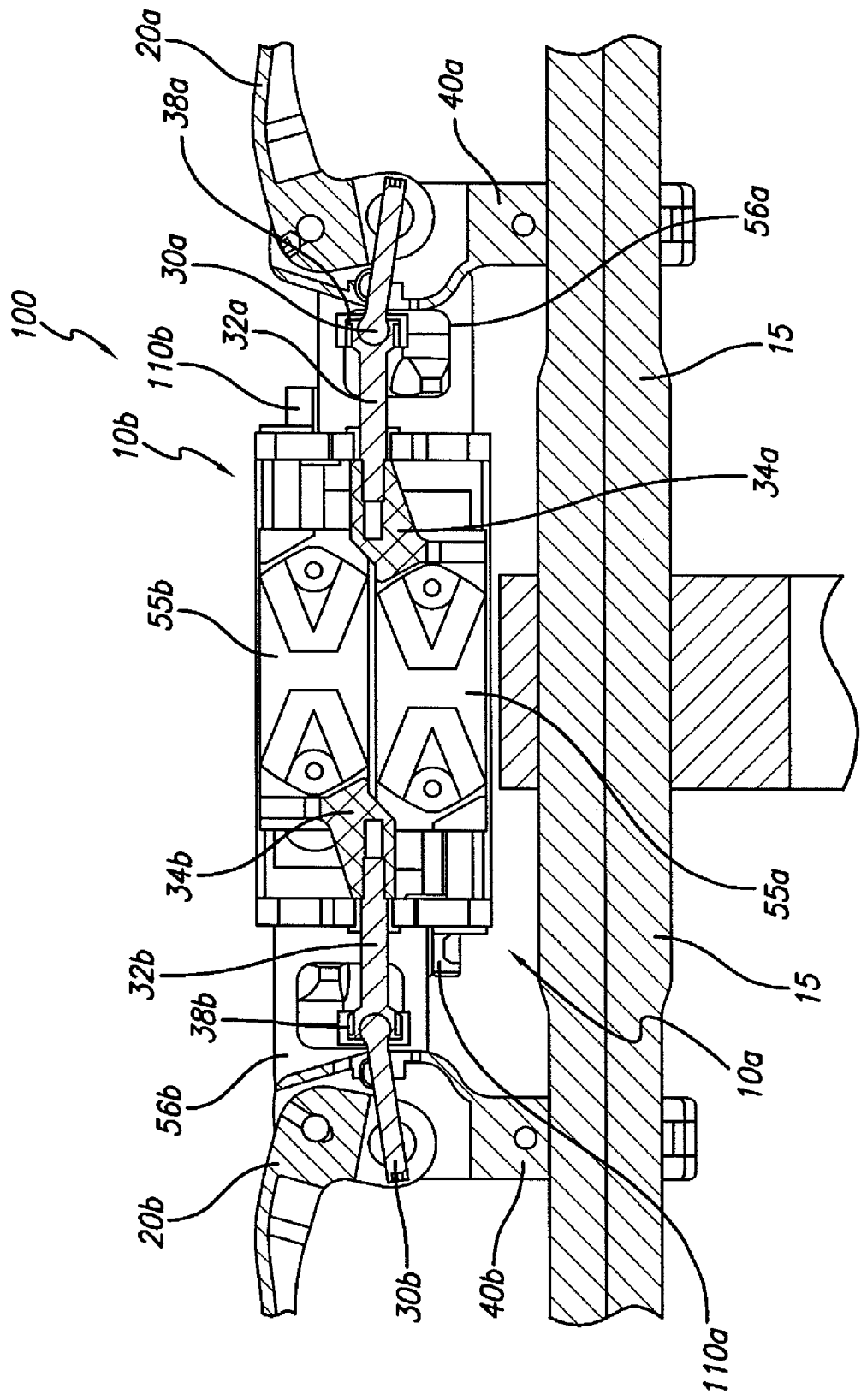
FIG. 7 is a top plan view of the hydraulic assembly of FIG. 1 with a portion shown in section to show the connection of the first lever, coupling member, push rod and protrusion.

A preferred embodiment of the hydraulic assembly 100 will now be described. In a preferred embodiment of the invention, housing assembly 10 is actuated by first 20 and second levers 25. Referring to FIGS. 1 and 7, first lever 20 is preferably connected to handlebar 15 by bracket 40, and the second lever 25 is preferably connected to handlebar 15 by bracket 42. However it will be understood that any suitable lever attachment mechanism as is known in the art is within the scope of the present invention.

In a preferred embodiment, the housing assemblies 10a and 10b are situated on a base plate 50 having a pair of upwardly extending side plates 52. The side plates 52 each include a horizontally extending lever attachment bracket 56 to which mounting bracket 40 is secured. Therefore, base plate 50 is secured in front of handle bar 15 by a connection between the horizontally extending lever attachment bracket and mounting bracket 40 (which is attached to handle bar 15). Lever attachment bracket 56 includes an opening 58 defined therein for securing the mounting bracket in placed via a caulking pin, pivot pin, threaded fastener or the like. In an alternative embodiment, the lever attachment bracket and mounting bracket can be all one piece.

Referring to FIGS. 1 and 8A-8E, as discussed above, base plate 50 includes two side plates. Preferably, side plates 52a and 52b are contiguous with base plate 50. Alternatively, side plates 52a and 52b can be connected to base plate 50 by welding, gluing or the like. Side plates 52a and 52b include openings 62a and 62b defined therein for receiving piston ends 82 and 83 of pistons 80 and openings 61a and 61b defined therein for receiving cables 95a and 95b (described below) therethrough. In a preferred embodiment, side plates 52a and 52b also have openings 53a and 53b defined therein for receiving push rods 68a and 68b.

Referring to FIGS. 4 and 8A-8E, the housings 55a and 55b are preferably slideable on the base plate 50 in directions substantially parallel to the axis of cylinders 60a and 60b. In a preferred embodiment, base plate 50 includes first and second tracks 54a and 54b that are configured to allow housings 55a and 55b to slideably move thereon. As will be described below, the housings 55 slide along track 54 as a result of actuation of one of the levers 20 and 25. The base plate 50, as shown in FIGS. 8A-8E, is configured to hold two housings 55. It will be understood that base plate 50 may be configured to hold one housing or may be configured to hold more than two housings without departing from the scope of the present invention. In addition, base plate 50 may comprise more or less tracks without departing from the scope of the present invention. The number of tracks 54, for example, may be proportional to the number of housings 55 seated on the base plate 50. In an alternative embodiment, the housings 55 may be slideable by other means. For example, the housings may be moveable via rollers.

In a preferred embodiment, the side plates 52a and 52b each include a guide hole 59a and 59b defined therein. The guide holes 59a and 59b cooperate with guide pins 58a and 58b that extend outwardly from housings 55a and 55b. Guide pin 58 and Guide hole 59 provide stability to housing 55 when it slides on plate 50. Guide pin 58 and guide hole 59 are configured to allow housing 55 to move straight and parallel relative to base plate 50 and piston 80 when housing 55 is pushed by first lever 20. In a preferred embodiment, the guide hole 59 can include a low friction bearing surface or coating therein to aid in guide pin 58 sliding therein.

Generally, in a preferred embodiment, first lever 20 is operatively associated with the cylinder 60, and the second lever 25 is operatively associated with piston 80. In another preferred embodiment, first lever 20 is operatively associated with piston 80 and second lever 25 is operatively associated with cylinder 60.

Figure 4:
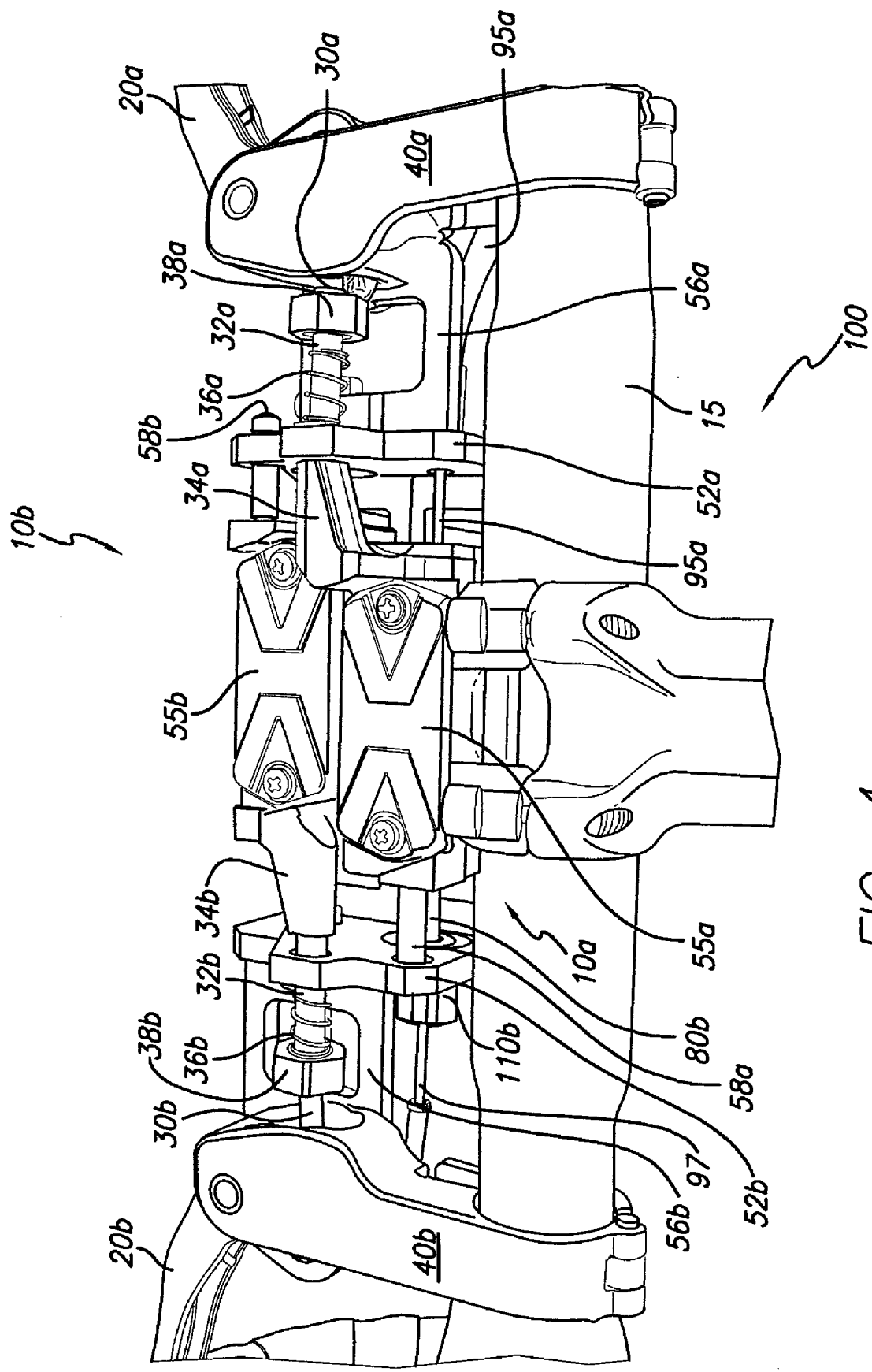
FIG. 4 is a top perspective view of the hydraulic assembly of FIG. 1.

As shown in FIGS. 4 and 7, first levers 20a and 20b are operatively associated with housings 55a and 55b, and, therefore, cylinders 60a and 60b. In a preferred embodiment, first lever 20 pushes housing 55, thereby causing housing 55, and cylinder 60, to move relative to piston 80 therein. This is similar to the movement of the piston and the cylinder as disclosed in U.S. Patent Application Publication No. 2006/0266595, entitled Dual-Lever Hydraulic Brake Assembly and Method of Using the Same, the entire contents of which is incorporated by reference herein.

Figure 5:
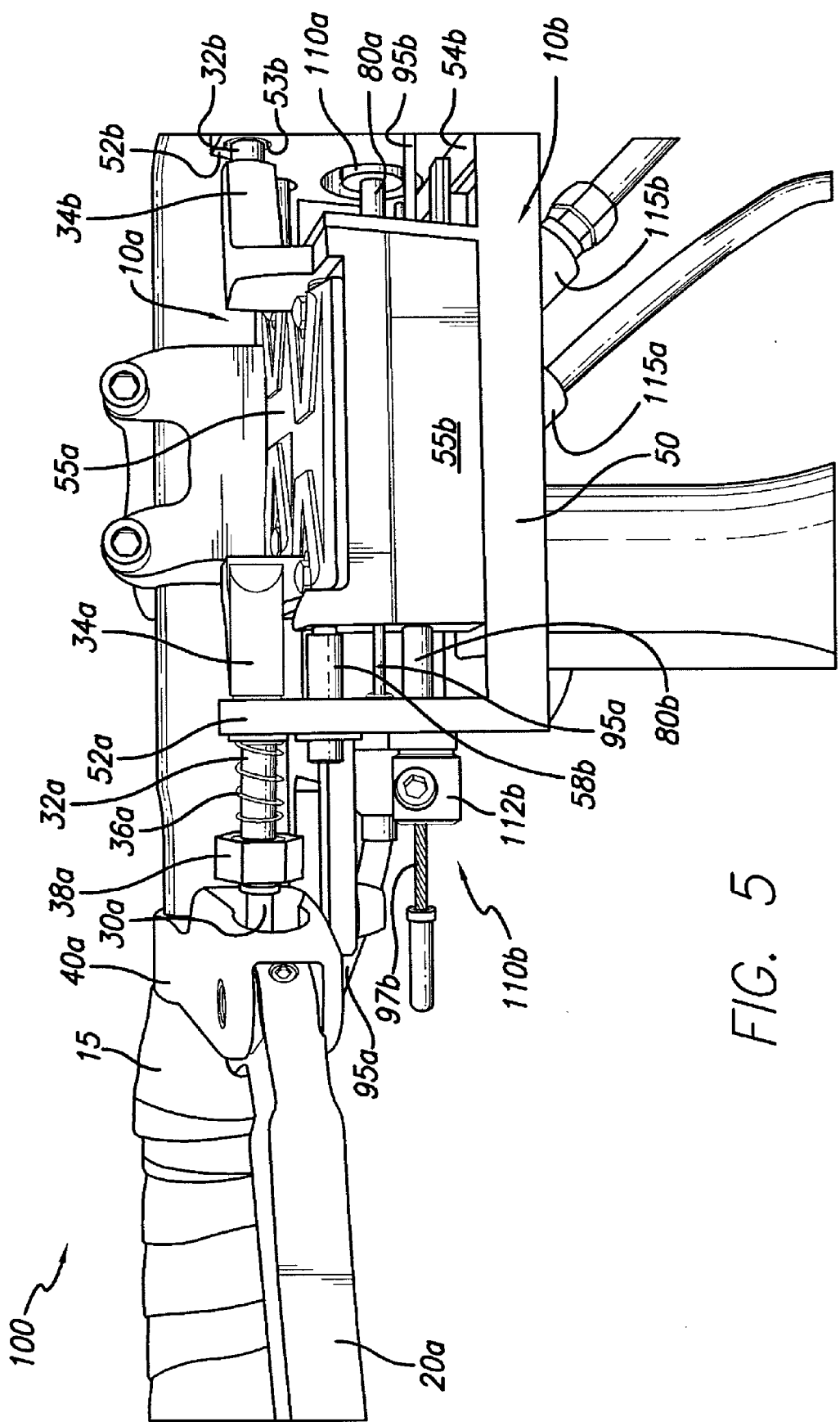
FIG. 5 is a front perspective view of the portion of the hydraulic assembly of FIG. 1 to the rider's right.

In a preferred embodiment of the present invention, first lever 20 is mechanically communicated with housing 55 via a coupling member 30 and a push rod 32. One end of coupling member 30 is received in first lever 20, and the other end is rotatably received in a socket in the end of push rod 32. Push rod 32 extends through opening 53 in side plate 52 and is received in an opening defined in protrusion 34. As shown in FIG. 5, a spring 36 is received on push rod 32 and extends between the head 38 of push rod 32 and side plate 52. Spring 36 biases first lever 20 to its non-actuated position (is this correct?). As a result of this configuration, when first lever 20 is actuated, coupling member 30 moves, which pushes push rod 32, which, in turn, pushes protrusion 34, thereby moving housing 55 (see FIG. 3B). The movement of housing 55 with respect to piston 80 will be described below. It will be appreciated that other mechanisms for pushing the housing 55 (and cylinder 60) are within the scope of the invention. For example, the push rod may be omitted. The important aspect of the invention as that actuation of first lever 20 pushes housing 55 and cylinder 60. In another embodiment, first lever 20 can push piston 80.

Figure 2:
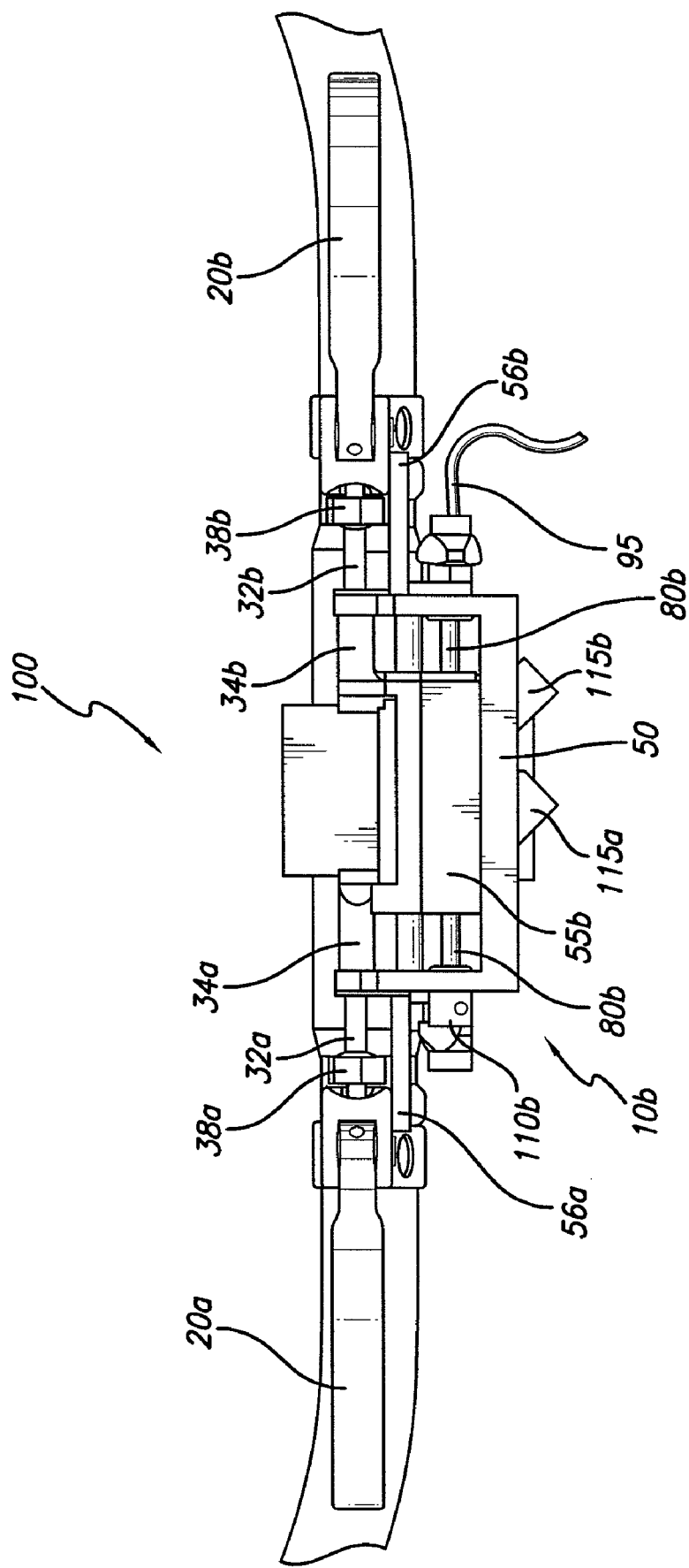
FIG. 2 is a front elevational view of the hydraulic assembly of FIG. 1 attached to the handlebars of a bicycle.

Referring to FIGS. 1-3 and 6, in a preferred embodiment of the present invention, the second levers 20a and 20b are operatively associated with the pistons 80a and 80b. Piston 80 is preferably received in and moveable within cylinder 60 (as shown in FIGS. 3A-3C). As shown in FIG. 2, piston 80 includes a central portion 81 and two outwardly extending end portions 82 and 83. In a preferred embodiment, the end portions 82 and 83 protrude through the ends of cylinder 60 and outside of housing 55. It will be understood that in this embodiment, the housing includes seals that prevent fluid from leaking outside of housing 20 as a result of the piston ends 82 and 83 extending out of housing 55.

In a preferred embodiment, the second lever 25 is operatively associated with piston 80 via a cable 95. Preferably, piston 80 defines an opening 65 extending axially therethrough for receiving cable 95. In this embodiment, the cable 95 has a first end 96 and a second end 97. The first end 96 preferably engages the second lever 20 (as is known in the art) and the second end 97 is associated with piston 80. In a preferred embodiment, cable 95 extends through opening 65 and out the end of piston 80 (or end portion 83).

Figure 6:
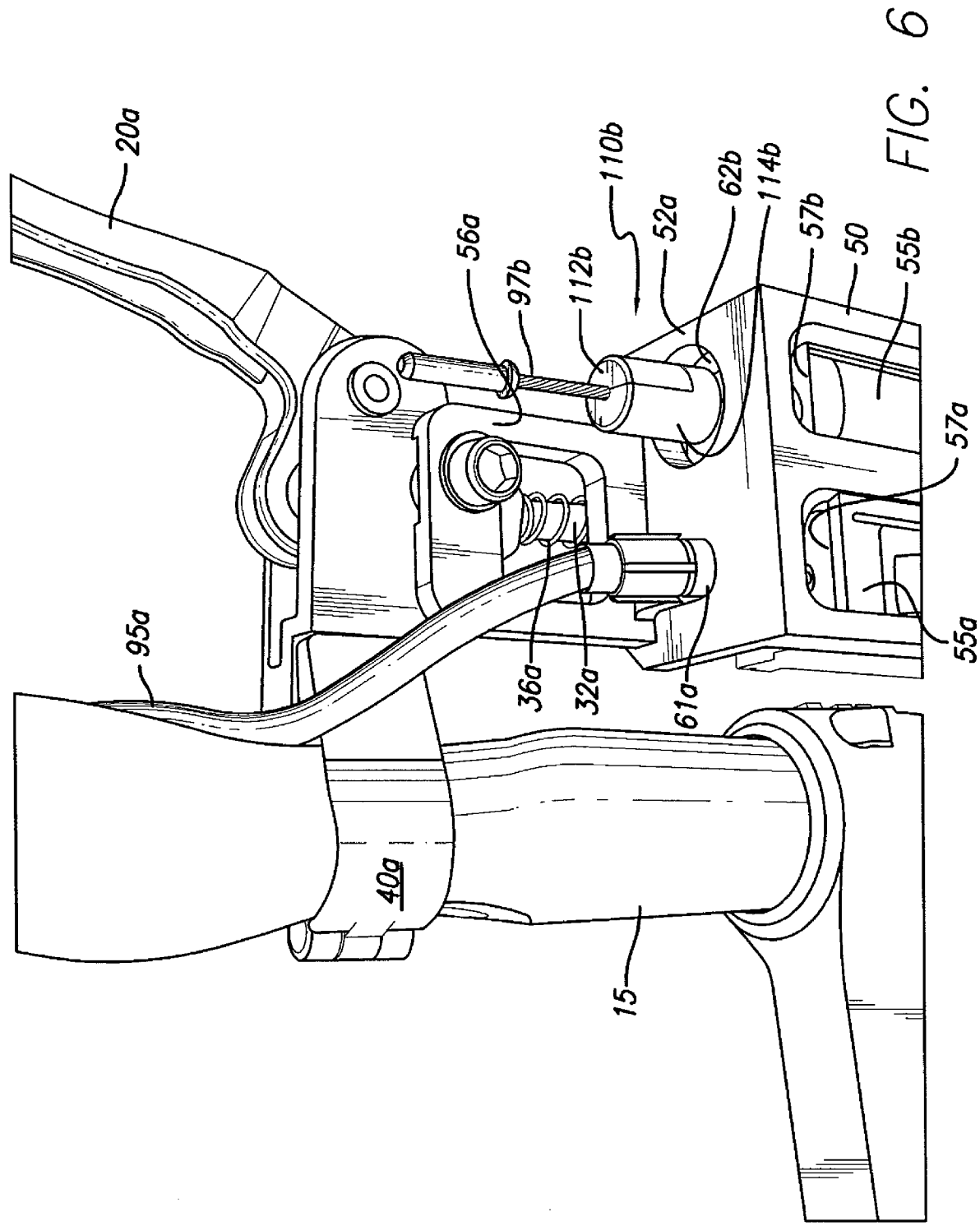
FIG. 6 is a bottom perspective view of a portion of the hydraulic assembly of FIG. 1 showing the cable and connector extending outside the side plate

As shown in FIG. 6, second end 97 of cable 95 extends through opening 61 in side plate 52. Cable 95 is preferably secured in place by a connector 110. It will be understood that any connector or mechanism that secures the second end 97 of cable 95 in place and prevents it from being pulled back through piston 80 is within the scope of the present invention. In the preferred embodiment, connector 110 preferably comprises a first piece 112 and a second piece 114. As shown in FIG. 6, first piece 112 clamps cable 95 to second piece 114 using a threaded fastener 116 (see FIG. 5) that is threaded into corresponding openings in first and second pieces 112 and 114. In a preferred embodiment, first and second pieces 112 and 114 each include a corresponding channel for receiving cable 95.

As shown in FIG. 5, one end of second piece 114 abuts the end of piston 80. In operation, when second lever 25 is actuated, cable 95 is pulled. As a result of the tension in cable 95 and connector 110 abutting the end of piston 80, piston 80 is pulled and moves within cylinder 60 (see FIG. 3C). It will be appreciated that other mechanisms for pulling piston 80 are within the scope of the invention. For example, cable 95 can be connected to piston 80 by a fastener instead of running through an opening therein. The important aspect of the invention is that actuation of second lever 25 pulls piston 80.

Figure 3A:
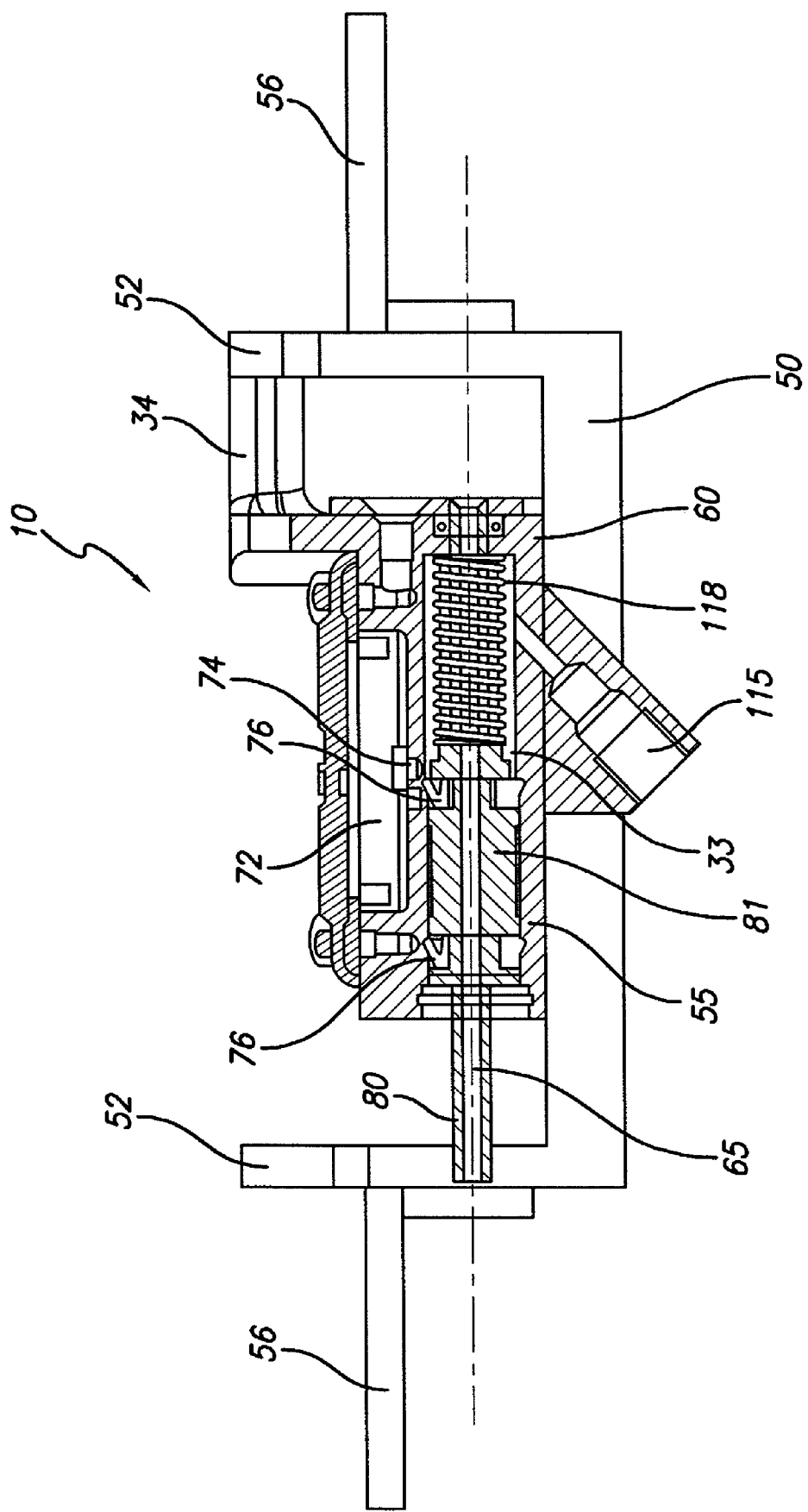
FIG. 3A is a cross-sectional view of a housing assembly of the hydraulic assembly of FIG. 1 showing both the piston and the cylinder in non-actuated positions.
Figure 3B:
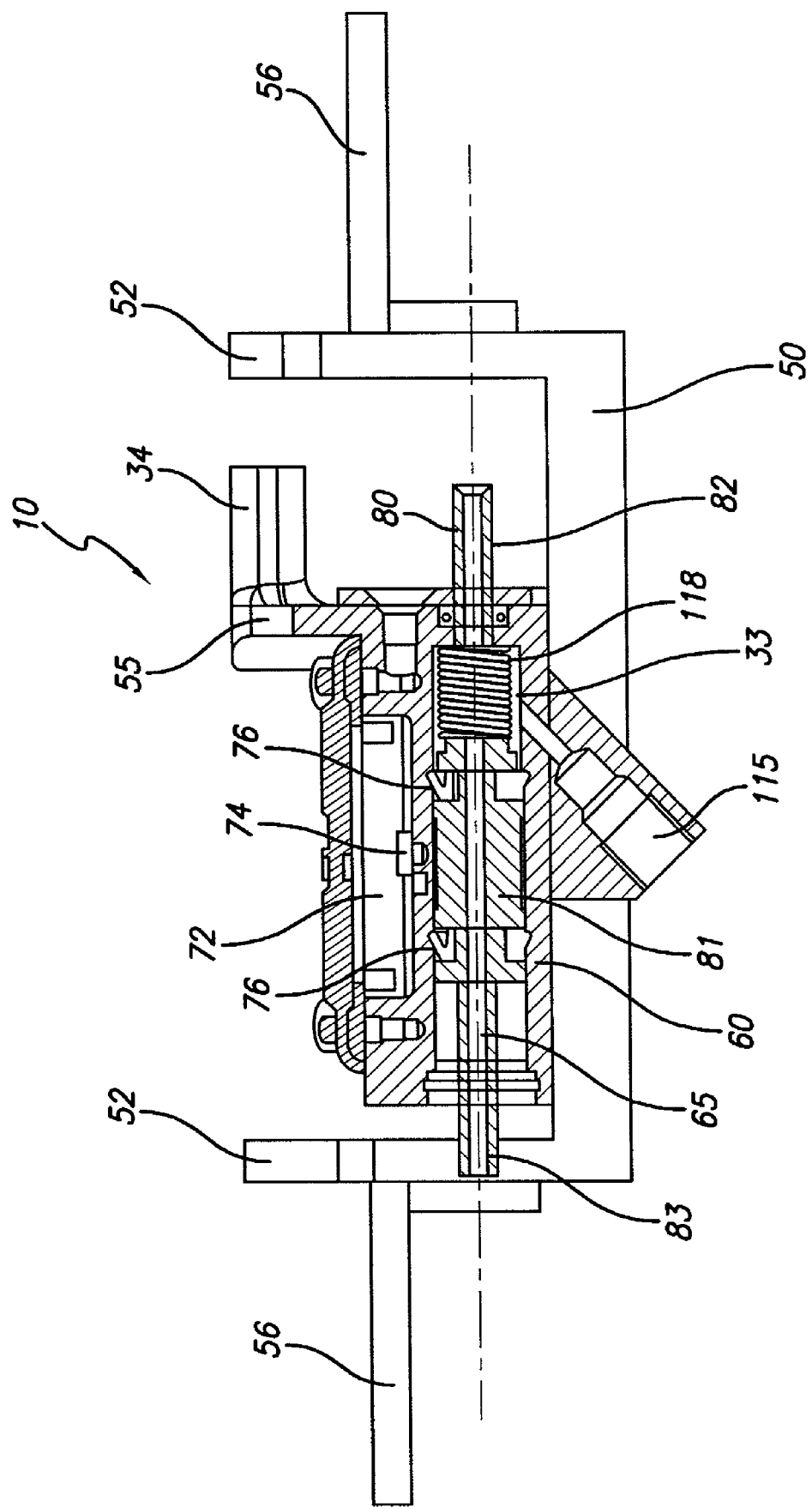
FIG. 3B is a cross-sectional view of the housing assembly of FIG. 3A showing the cylinder in an actuated position.
Figure 3C:
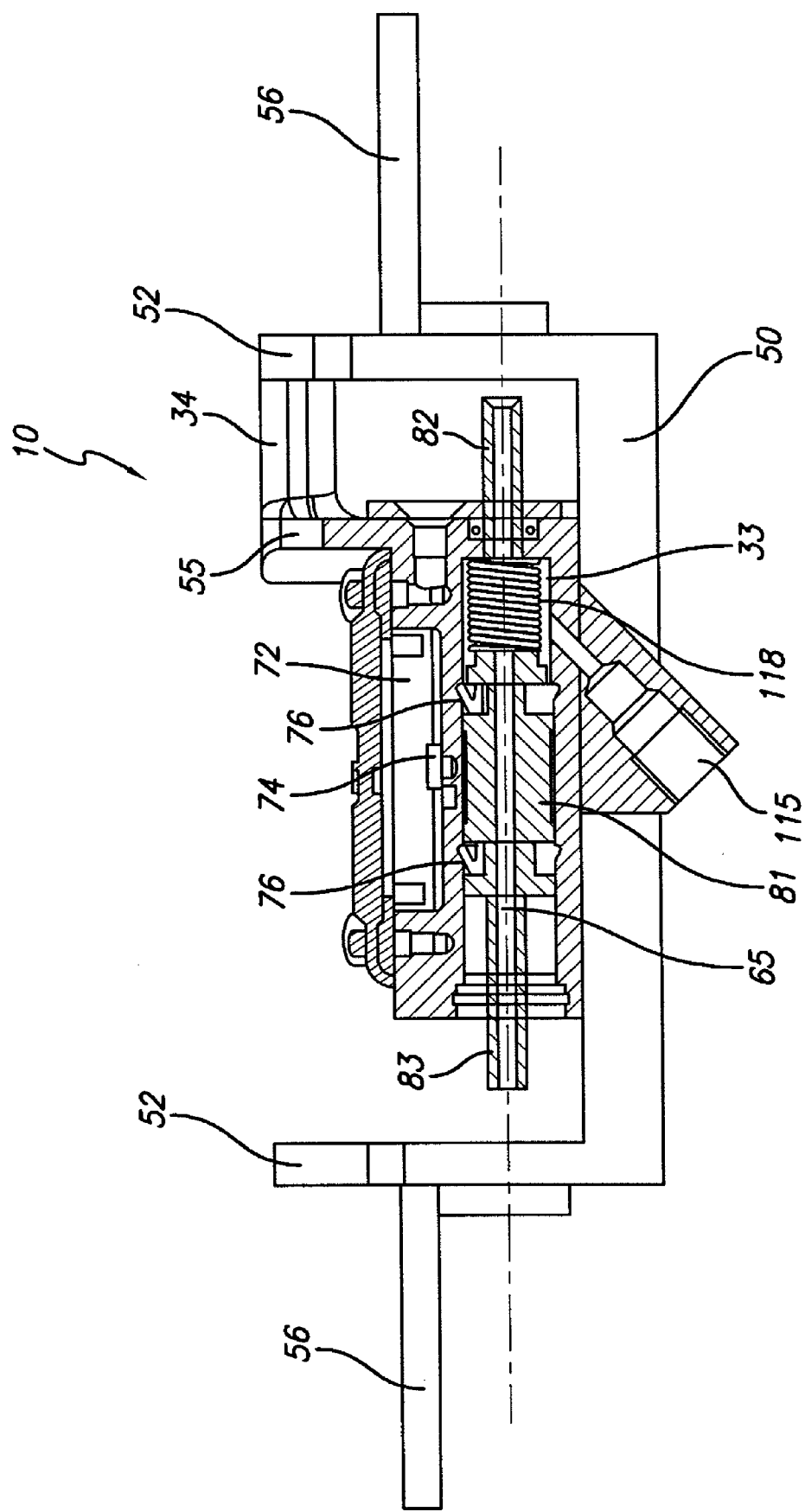
FIG. 3C is a cross-sectional view of the housing assembly of FIG. 3A showing the piston in an actuated position.

As shown in FIGS. 3A-3C, cylinder 60 and piston 80 define a fluid containing region 33 which contains a volume of hydraulic fluid. The hydraulic fluid is used to actuate the hydraulic braking system. In addition, hydraulic fluid is stored in a reservoir 72 and is released through port 74 as piston/cylinder move with respect to each other according to the position of seals 76, as is known in the art. As will be described more fully below, as the volume of fluid containing region 33 decreases, fluid is forced through a conduit 115 and to the braking system.

FIGS. 3A-3C show cross-sectional views of a preferred embodiment of the housing assembly 10 of the present invention. The three different views of FIGS. 3A-3C show different positions of cylinder 60 and piston 80. FIG. 3A shows housing assembly 10 in a starting or non-actuating position. FIG. 3B shows cylinder 60 in an actuating position, and FIG. 3C shows piston 80 in an actuating position.

With reference to FIG. 3A, in a preferred embodiment, a spring 118 biases cylinder 60 and piston 80 to their non-actuating positions. In this position the levers 20 and 25 are not being actuated and the brakes are not being applied. Thus, in the case of a disc brake system, the brake pads are preferably spaced apart from the rotor. It will be understood that from this position, the brakes can be actuated (in other words, hydraulic fluid can be forced from the fluid containing region 33) by either movement of first lever 20 or second lever 25. Generally, as will be apparent to those skilled in the art, the movement of the cylinder 60 and piston 80 with respect to one another adjusts the volume of fluid in the fluid containing region 33.

With reference to FIG. 3B, as described above, movement of first lever 20 (through pushing coupling member 30, push rod 32 and protrusion 34) pushes housing 55, thereby moving cylinder 60 to the right (as shown in FIG. 3B). As a result of the tension on cable 95 and connector 110 abutting the end of piston 80, piston 80 remains stationary (in its non-actuated position). Therefore, cylinder 60 moves with respect to piston 80, causing port 74 to move past seal 67, thereby isolating fluid containing region 33 and forcing fluid through conduit 115. This action actuates the brake system.

With reference to FIG. 3C, as described above, movement of second lever 25 (through cable 95 and connector 110) pulls piston 80 to the right (as shown in FIG. 3C). As a result of protrusion 34 abutting side plate 52, cylinder 60 remains stationary (in its non-actuated position). Therefore, piston 80 moves with respect to cylinder 60 causing seal 67 to move past port 74, thereby isolating fluid containing region 33 and forcing fluid through conduit 115. This action actuates the brake system.

Generally, as can be seen in FIGS. 3B and 3C, when first lever 20 is moved cylinder 60 is pushed in a first direction and when second lever 25 is moved piston 80 is pulled in a generally opposite second direction.

Figure 8A:
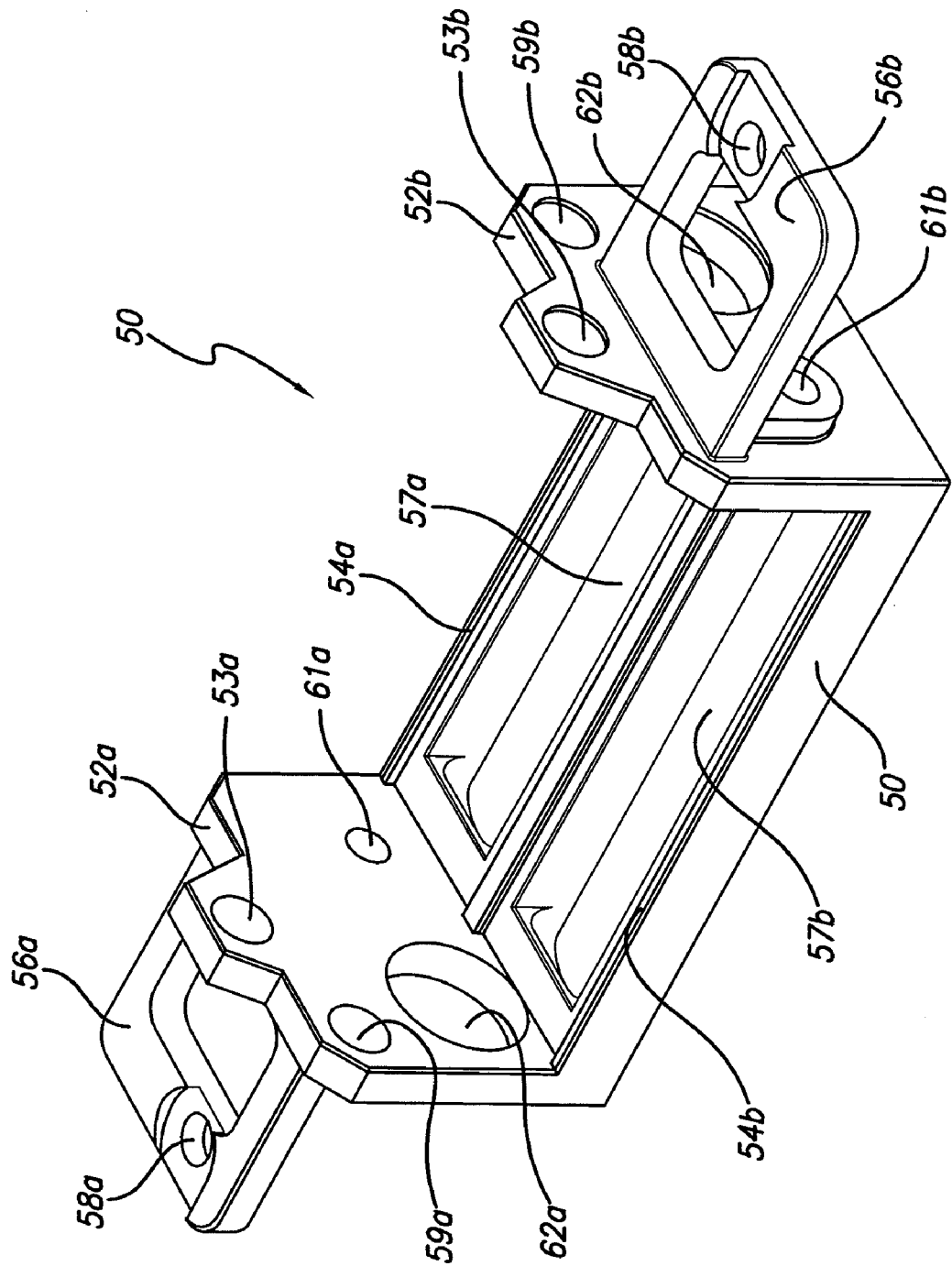
FIG. 8A is a perspective view of the base plate, side plates and lever attachment brackets.
Figure 8B:
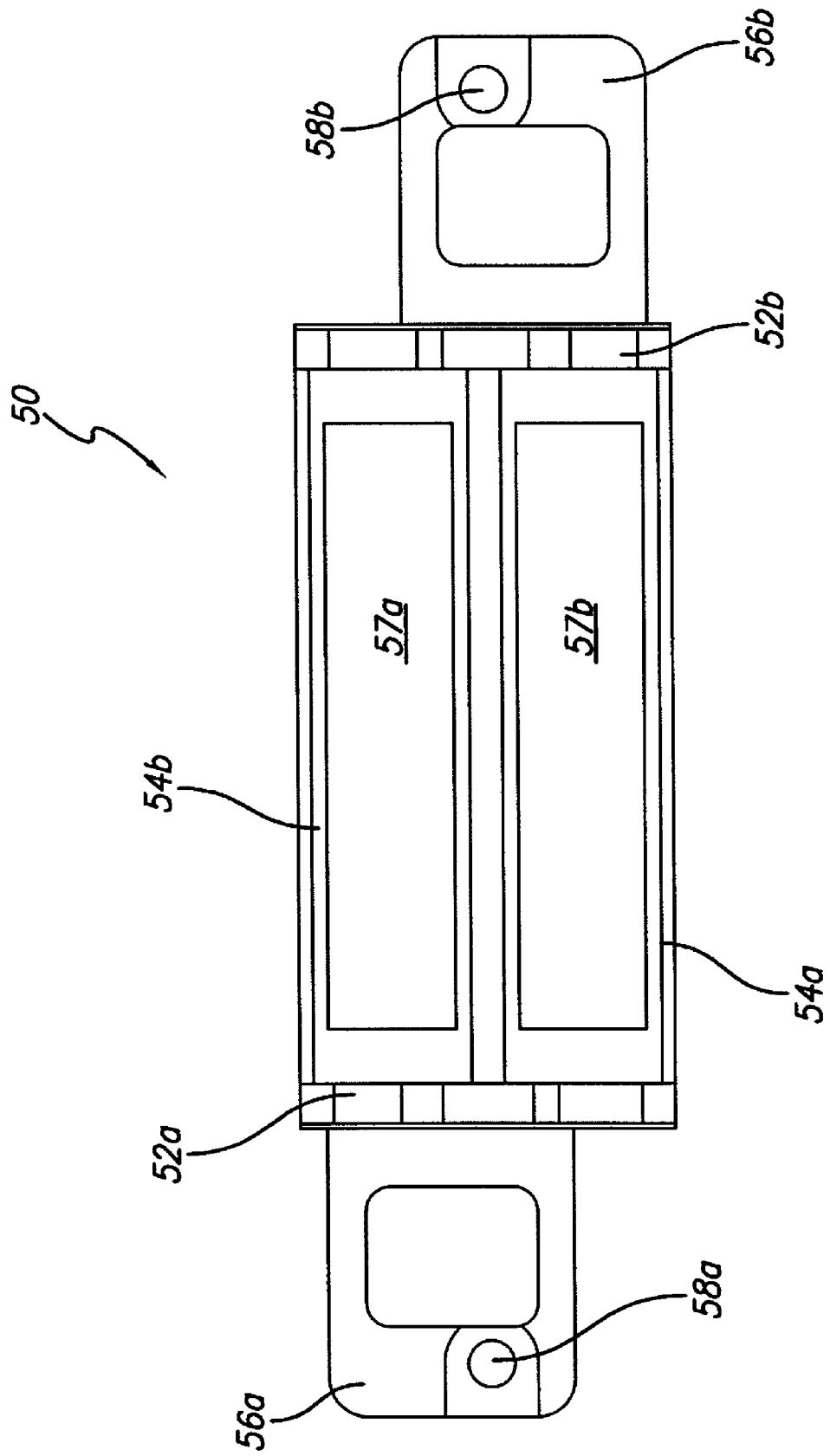
FIG. 8B is a top plan view of the base plate, side plates and lever attachment brackets.
Figure 8C:
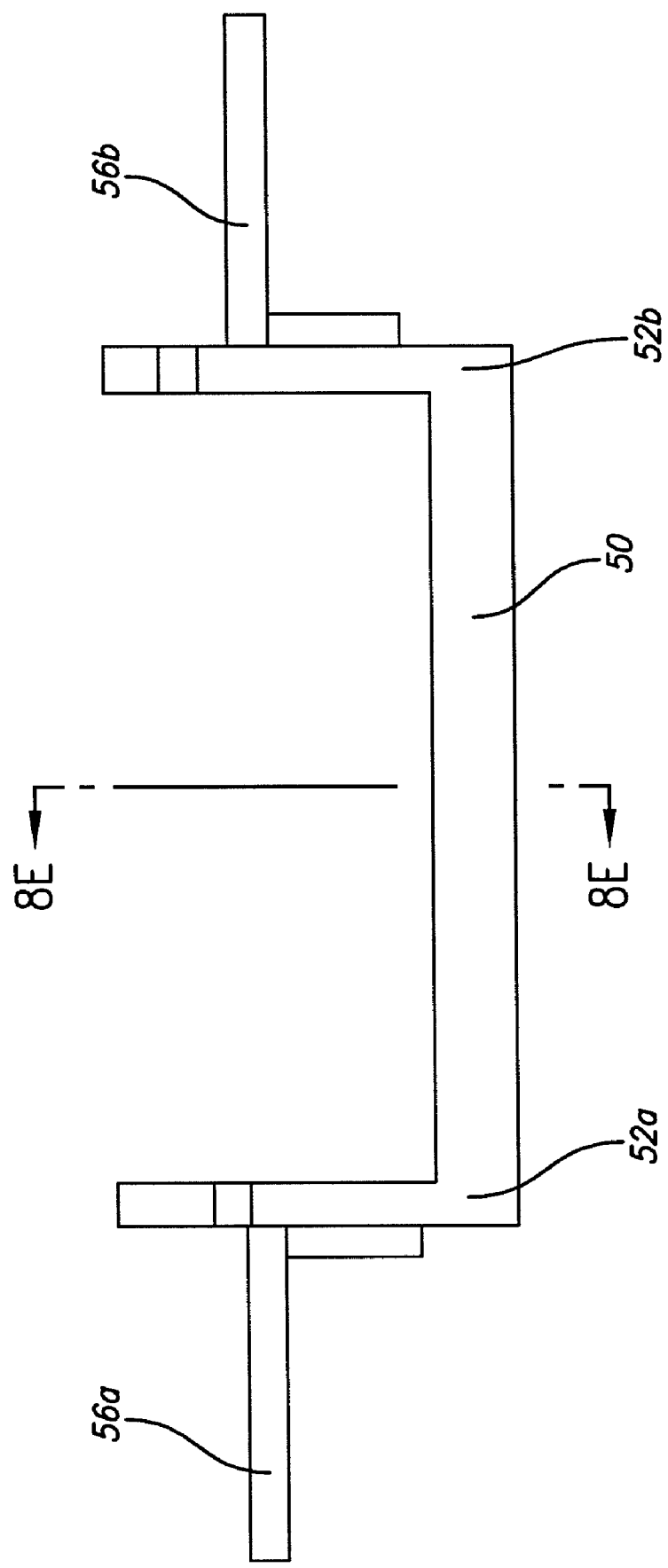
FIG. 8C is a side elevational view of the base plate, side plates and lever attachment brackets.

As described above, when housing 55 moves, it slides along track 54 on base plate 50. As shown in FIGS. 8A-8B the base plate includes a slot 57 (or slots 57a and 57b) defined therein through which conduit 115 extends. This allows conduit 115 to move with housing 55 as it slides on base plate 50.

In other preferred embodiments, it will be understood that second lever 25 can be operatively associated with the cylinder 60 and first lever 20 can be operatively associated with the piston 80. In other words, the system can be configured such that cylinder 60 is pulled and piston 80 is pushed. For example, cable 95 can be secured in protrusion 34, thereby allowing cylinder 60 to be pulled when second lever 25 is moved. It will also be understood that second lever 20 may be operatively associated with one of the piston or cylinder by any mechanism that can pull (or place tension on them), and therefore the invention is not limited to the use of a cable for pulling one of the piston or the cylinder.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A hydraulic assembly for a hydraulic disc brake system, comprising:
    (a) a housing defining a cylinder,
    (b) a piston received in and moveable within the cylinder,
    (c) a first lever operatively associated with one of the piston or the cylinder,
    (d) a second lever operatively associated with the other of the piston or the cylinder,
    (e) a cable having first and second ends, wherein the first end engages the piston or the cylinder and the second end engages the second lever,
    wherein moving the first lever pushes one of the piston or the cylinder in a first direction, and wherein moving the second lever pulls the other of the cylinder or the piston in a second direction.

2. The hydraulic assembly of claim 1, wherein the piston has a non-actuated position and a fully actuated position, and the piston is biased towards the non-actuated position, and wherein the cylinder has a non-actuated position and a fully actuated position, and the cylinder is biased towards the non-actuated position.

3. The hydraulic assembly of claim 1, wherein moving the first lever pulls the cable, thereby moving the piston with respect to the cylinder or moving the cylinder with respect to the piston.

4. The hydraulic assembly of claim 1 wherein the piston defines an opening extending axially therethrough, and wherein the cable extends through the opening.

5. The hydraulic assembly of claim 4, wherein the first end of the cable extends outside of the piston and is secured by a connector.

6. The hydraulic assembly of claim 1, wherein moving the second lever pulls the cylinder or the piston, thereby moving the cylinder with respect to the piston or the piston with respect to the cylinder, respectively.

7. The hydraulic assembly of claim 1 further comprising a volume of hydraulic fluid contained in the cylinder, wherein moving either the first or the second lever displaces a volume of hydraulic fluid from the housing.

8. The hydraulic assembly of claim 5 wherein the connector comprises a first piece that clamps the cable to a second piece.

9. A hydraulic assembly for a hydraulic disc brake system, comprising:
    (a) a base plate that includes at least one track,
    (b) a housing defining a cylinder, wherein the housing is slidingly seated on the track,
    (c) a piston received in and moveable within the cylinder,
    (d) a cable having first and second ends, wherein the first end engages the piston and the second end is adapted to engage a lever, such that when the lever is pivoted the piston moves within the cylinder, and
    (e) a bracket connected to the base plate, wherein the bracket is configured to attach the base plate to a handlebar.

10. A hydraulic assembly for a hydraulic disc brake system, comprising:
    (a) a base plate that includes at least one track and at least one upwardly extending side plate that comprises an opening for receiving a cable,
    (b) a housing defining a cylinder, wherein the housing is slidingly seated on the track,
    (c) a piston received in and moveable within the cylinder, and
    (d) a bracket connected to the base plate, wherein the bracket is configured to attach the base plate to a handlebar.

11. A hydraulic assembly for a hydraulic disc brake system, comprising:
    (a) a base plate that includes at least one track and a lever attachment bracket that connects the base plate to a first lever, wherein the first lever moves in a plane generally parallel to the base plat,
    (b) a housing defining a cylinder, wherein the housing is slidingly seated on the track,
    (c) a piston received in and moveable within the cylinder,
    (d) a cable having first and second ends, wherein the first end engages the piston and the second end is adapted to engage a second lever, such that when the second lever is pivoted the piston moves within the cylinder, and
    (e) a bracket connected to the base plate, wherein the bracket is configured to attach the base plate to a handlebar.

12. The hydraulic assembly of claim 9 wherein the housing is slideable on the base plate in a direction substantially parallel to an axis of the cylinder.

13. The hydraulic assembly of claim 9 wherein at least a portion of the piston extends outside of the housing.

* * * * *